Figure 1:
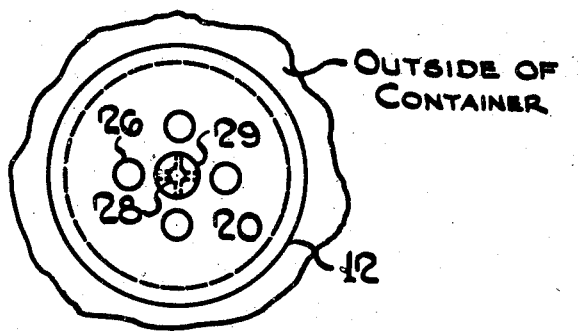

April 27, 1948.　　　　　L. M. COOPER　　　　　2,440,462
PRESSURE RELIEF DEVICE
Filed June 28, 1945

Lyle M. Cooper Inventor
By ＿＿＿＿＿ Young Attorney

Patented Apr. 27, 1948

2,440,462

UNITED STATES PATENT OFFICE 2,440,462

PRESSURE RELIEF DEVICE

Lyle M. Cooper, Rahway, N. J., assignor to Standard Oil Development Company, a corporation of Delaware Application June 28, 1945, Serial No. 602,127

5 Claims. (Cl. 220—85)

This invention relates to pressure relief systems, and more particularly to pre-set pressure relief devices.

In the prior art, flexible diaphragms movably responsive to predetermined pressures into severing contact with a puncturing element have been extensively utilized in the fabrication of pressure relief devices. The diaphragms in these devices are formed of materials substantially self-supporting under normal pressures but are easily ruptured when contacted with a cutting element at the predetermined pressure level. The diaphragms in such usages undergo deterioration under extended periods of usage due to fatigue and thus become unreliable. The device of this invention substantially overcomes this defect and is a reliable safety device operable within a narrow range of the calculated pressure.

It is an object of the present invention to design a safety device in which the means of pressure release involves the coaction of elements easily subject to control within close limits of calculated pressure. It is also an object of the invention to design a pressure relief system for small containers which is highly resistant to fatigue. Other purposes and objects will be apparent from the following description and illustration of the invention.

The device of the invention depends for its essential functioning upon the snap action on to a cutting means, such as a sharpened point or edge, of a flexible diaphragm having an easily penetrable element. The flexible diaphragm is initially buckled sufficient to impart a snap action effect when pressure is applied to the diaphragm to reverse its convex-concave position sealing the vessel. Thus the diaphragm is commonly a buckled spring. The easily penetrable element is normally a thin disc of material, such as metallic foil or a plastic, attached to and sealing a perforation centrally located in the flexible diaphragm, but may be a portion of the diaphragm. The diaphragm is thus usually formed of a material having a thickness and tensile strength proportional to its diameter so that under normal pressures it is substantially self-supported but will yield to the predetermined pressures acting on its convex surface. The height of the convexity and the tensile strength of the material are also designed so that when excessive predetermined pressures occur within the vessel the pressure will cause the diaphragm to reverse itself and the rupturable membrane will engage the sharpened point or edge, suitably located for such functioning. The particular advantages of having the penetrable element distinct from the diaphragm are in regard to replacement of the element after rupture and extended selection of materials. The cutting means for the membrane is so located and designed that the sealing member is definitely ruptured so that practically no portion remains to extend over the cutting to impair the free passage of the gases from the container.

In order that the invention may be more fully understood, description and illustration will be presented of a particular embodiment.

Figure 2:
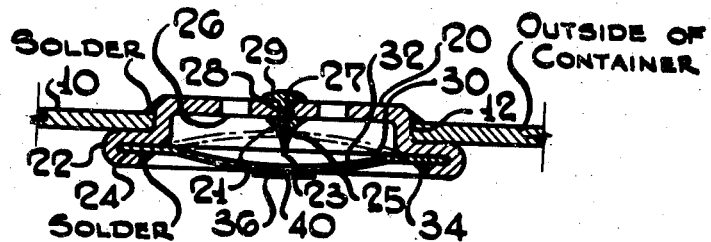
Figure 3:
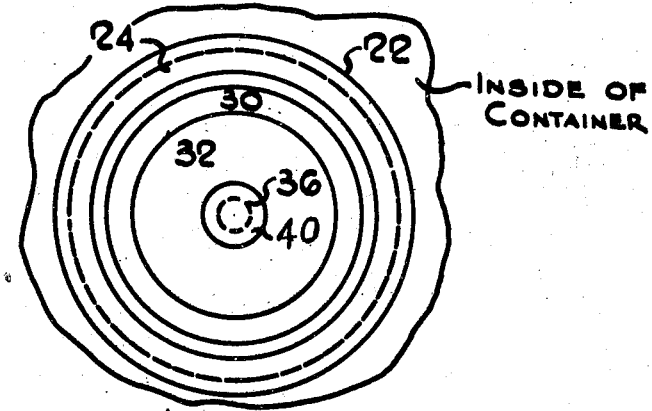

Figure 1 is a top or outside view of my pressure relief device positioned on a container. Figure 2 is a side view of my device positioned in the wall of a container, while Figure 3 is a bottom or inside view of my device positioned in a container.

The description and drawing relate to a conventional view of a portion of a vessel equipped with a pressure safety device according to the invention. In the drawing, the wall 10 of a vessel is shown as having an opening 12 into which the device of the present invention is hermetically attached by soldering, brazing, screwing or other such convenient means. The body 20 is shown as being cup-shaped with a radial flared portion 22. The flare 22 is bent inward with a crimping effect 24. Holes 26 are pierced in the bottom of the cup. In the center of the cup the hole 28 is closed by the pin 21 either by riveting or threading. The pin 21 has a sharp piercing point 23 and longitudinal ribs 25 disposed radially about the pin's axis. The pin 21 is also shown as having a cylindrical shank 27 passing into and through the hole 28 and is assembled to the cup 20 by threading or peening over its projecting end as shown at 29. A thin circular diaphragm 30 is adapted to cover the opening in the body 20. The diaphragm 30, in covering the opening in the body 20, has a bulge or buckle 32 and is assembled into the crimped walls of the cup 20 so that the buckle normally projects toward the interior for pressure vessels and to the exterior for vacuum vessels and is made hermetically tight around the outer edge by means of a gasket, or soldering or welding as shown at 34. The material and construction of the buckled diaphragm 30 are such as to resist deformation until a predetermined pressure applied to its convex surface will suddenly distort and reverse the buckle from one side of the diaphragm to the opposite side. This action will occur in a rapid manner and in most cases with an audible snapping noise. For this action, the diaphragm is preferably constructed of metal, but many plastics are also suitable.

At the center of the diaphragm 30, that is, at the tip of the bulge 32, a hole 36 occurs. This hole is covered and sealed by a small disc 40 of thin material, preferably metal foil. The disc 40 is sealed to the diaphragm 30 by means of sweating, cementing, or other such suitable method of bonding which will provide a leak-proof seal at the juncture of the two pieces.

In this pressure relief embodiment of the invention, the diaphragm 30 in the device, when the latter is mounted over an opening in a vessel containing highly volatile liquid under positive pressure, responds slightly to pressure variations without effect until the predetermined positive pressure occurs. When the positive pressure reaches a certain value, the bulge will be suddenly transferred from the convex to the concave position. The pin 21 is of such length that when the bulge snaps to the concave position relative to the contents of the vessel the pin will pierce the disc 40, permitting the contained gases to escape through the cup 20 and out through the vent holes 26 in order to relieve the pressure. The rupture by the pin of the disc 40 occurs as a small irregular hole due to the ribs 25 on the pin. A hole of this character will not be entirely closed by the piercing pin but channels will be left between the ribs.

Thus, the invention relates to devices which are suitable for storage of highly volatile liquids and for the preservation of many type foods. The devices of the invention are particularly suitable for such uses in that the pressure relief means also provides a feasible means for indicating the release of pressure after the abnormal conditions have prevailed. This feature of external observation, that is, the rupture of the sealing membrane, is particularly important in the case of the storage of foods in which an increase of pressure within the container indicates deterioration of the contents as a food material. Devices designed according to the invention are also suitable for vessels containing materials having pressures below that of the atmosphere. In this latter case, the membrane is convex towards the atmosphere so that when the external pressure is greater than that for which the vessel is designed, the flexible diaphragm will spring from the convex to the concave position, causing the sealing membrane to contact the cutting means with some measure of force and thus relieve the pressure.

What is claimed is:

1. A pressure relief device for application to a vent opening of an enclosure, comprising a centrally perforated diaphragm of characteristically springy material in concave-convex relationship with said vent opening and having an easily penetrable element, sealing said perforation in said diaphragm, said diaphragm having a preformed buckle sufficient to impart a snap action reversal when pressure is applied to the convex surface, said easily penetrable element being so located in relationship to penetrating means for said easily penetrable element that impingement and rupture occur by the rapid reversal of said concave-convex relationship of said diaphragm to said vent opening upon the development of a predetermined pressure within said enclosure.

2. A pressure relief device for application to a vent opening of an enclosure, comprising a flexible diaphragm securely attached to and sealing said vent opening, said diaphragm comprising a material having springy action characteristics and having a preformed buckle sufficient to form an inwardly directed convex surface and to impart a snap action reversal when pressure is applied to the convex surface; a central perforation in said diaphragm, a thin, easily penetrable material sealing the perforation in said diaphragm; and a cutting element against which said easily penetrable material may impinge and be ruptured upon development of a predetermined pressure within said enclosure.

3. A pressure relief device according to claim 1 in which the easily penetrable element is a thin disc of penetrable material attached to and sealing the perforation in said flexible diaphragm.

4. A pressure relief device according to claim 2 in which the easily puncturable material is metallic foil.

5. A pressure relief device according to claim 2 in which the easily puncturable material is a plastic material.

LYLE M. COOPER.

REFERENCES CITED

The following references are of record in the file of this patent:

UNITED STATES PATENTS

| Number | Name | Date |
|---|---|---|
| 2,222,703 | Bixler | Nov. 26, 1940 |
| 2,256,673 | Hansen | Sept. 23, 1941 |
| 2,320,211 | Bloom et al. | May 25, 1943 |
| 2,326,771 | Eidson | Aug. 17, 1943 |
| 2,378,135 | Evans | June 12, 1945 |